(12) United States Patent
Tahri et al.

(10) Patent No.: US 7,364,221 B2
(45) Date of Patent: Apr. 29, 2008

(54) REDUCTION OF VIBRATION TRANSFER (75) Inventors: Laurent Tahri, Cosne sur Loire (FR); Jean-Luc Wojtowicki, Pouilly sur Loire (FR); Sylvain Germes, Fontenay-le-Fleury (FR)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 58 days.

(21) Appl. No.: 11/542,928

(22) Filed: Oct. 2, 2006

(65) Prior Publication Data
US 2007/0100060 A1 May 3, 2007

(30) Foreign Application Priority Data
Oct. 6, 2005 (EP) ................... 05292082

(51) Int. Cl.
*E04B 1/82* (2006.01)
(52) U.S. Cl. .................. 296/187.02; 181/295
(58) Field of Classification Search ........... 296/187.02; 181/295
See application file for complete search history.

(56) References Cited

U.S. PATENT DOCUMENTS

| | | |
|---|---|---|
| 3,855,028 A | 12/1974 | Larson |
| 4,003,860 A | 1/1977 | Leclerc |
| 5,143,755 A | 9/1992 | Moore, III et al. |
| 5,160,465 A | 11/1992 | Soderberg |
| 5,213,391 A | 5/1993 | Takagi |
| 5,266,133 A | 11/1993 | Hanley et al. |
| 5,373,027 A | 12/1994 | Hanley et al. |
| 5,383,951 A | 1/1995 | Cross et al. |
| 5,575,526 A * | 11/1996 | Wycech .............. 296/205 |
| 5,631,304 A | 5/1997 | Hasegawa |
| 5,635,562 A | 6/1997 | Malcolm |
| 5,708,042 A | 1/1998 | Hasegawa |
| 5,992,923 A * | 11/1999 | Wycech .............. 296/187.02 |
| 6,096,403 A * | 8/2000 | Wycech .............. 428/122 |
| 6,110,985 A | 8/2000 | Wheeler |
| 6,150,428 A | 11/2000 | Hanley et al. |
| 6,168,226 B1 * | 1/2001 | Wycech .............. 296/146.6 |
| 6,199,940 B1 | 3/2001 | Hopton et al. |

(Continued)

FOREIGN PATENT DOCUMENTS

EP 0 062 166 10/1982

(Continued)

OTHER PUBLICATIONS

JP abstract 02057340 filed Feb. 27, 1990.

(Continued)

*Primary Examiner*—D. Glenn Dayoan
*Assistant Examiner*—Paul A Chenevert
(74) *Attorney, Agent, or Firm*—Stephen D. Harper (57) ABSTRACT

A thermally expandable material is provided that, once expanded, has a Young's storage modulus E' between 0.1 MPa and 1000 MPa, a loss factor of at least 0.3 (preferably, at least 1) and preferably a shear storage modulus G' between 0.1 MPa and 500 MPa at a temperature between −10 and +40 degrees C. in the frequency range 0 to 500 Hz. Such materials are useful in combination with a carrier to form a dissipative vibratory wave barrier that effectively reduces the transfer of vibrations from a vibration generator, as may be present in a vehicle.

12 Claims, 3 Drawing Sheets

U.S. PATENT DOCUMENTS

| | | |
|---|---|---|
| 6,281,260 B1 | 8/2001 | Hanley, IV et al. |
| 6,309,985 B1 | 10/2001 | Virnelson et al. |
| 6,458,863 B1 | 10/2002 | Yoshimura et al. |
| 6,828,020 B2 | 12/2004 | Fisher et al. |
| 6,830,799 B1 | 12/2004 | Duffin et al. |
| 7,141,194 B1 * | 11/2006 | Beckmann ................. 264/46.6 |
| 2002/0125739 A1 * | 9/2002 | Czaplicki et al. ........... 296/187 |
| 2003/0052516 A1 | 3/2003 | Czaplicki et al. |
| 2004/0124553 A1 | 7/2004 | Czaplicki et al. |
| 2004/0143969 A1 | 7/2004 | Czaplicki et al. |
| 2004/0227377 A1 | 11/2004 | Gray |
| 2004/0266898 A1 | 12/2004 | Kassa et al. |
| 2005/0017543 A1 | 1/2005 | Riley et al. |
| 2005/0197457 A1 | 9/2005 | Chaudhary et al. |
| 2006/0152041 A1 | 7/2006 | Igarashi et al. |

FOREIGN PATENT DOCUMENTS

| | | | |
|---|---|---|---|
| EP | 1 642 930 | 4/2006 | |
| WO | WO 99/488746 | 9/1999 | |
| WO | WO 2006-096531 | 9/2006 | |
| WO | WO 2007039309 A * | 4/2007 | ................. 181/295 |

OTHER PUBLICATIONS

JP abstract 2004 331707.
Intl Search Report , PCT/EP 2006/009665.
Intl Search Report, PCT/EP 2006/009666.

* cited by examiner

REDUCTION OF VIBRATION TRANSFER

CROSS-REFERENCE TO RELATED APPLICATIONS

This application claims priority under the Paris Convention to European Patent Application No. 05292082.4, filed 6 Oct. 2005, and incorporated herein by reference in its entirety.

1. Field of the Invention

The present invention relates to reducing the transfer of vibrations generated by a vibration generator.

2. Discussion of the Related Art

In a vehicle, the transfer of vibrations generated by a dynamic force generator, such as an engine, a motor, a pump or a gear box, via structural elements to an emitting surface such as a panel, leads to the emission of structure borne noise.

Different solutions have been suggested in order to at least reduce such structure borne noise. In vehicle construction, passive measures such as the recourse to vibration dampers or dampening mats have been proposed. Such dampening mats are often applied on vibrating panels, e.g., in the doors or on the floor of a vehicle. The extent of noise reduction of these methods is often unsatisfactory.

In the conventional process, mixtures of bitumen or asphalt and fillers with a high specific weight are extruded into sheets, from which the appropriate shapes are punched or cut. These sheets are then bonded to the appropriate metal sheet parts and must sometimes also be adapted to the shape of the sheet by heating. Although these bitumen sheets are still frequently used because of their low material cost, they are very brittle and tend to peel off from the metal sheet, particularly at low temperatures. Also, the incorporation of additives which has often been proposed only results in a slight improvement which is not sufficient for many applications. Moreover, it is completely impossible to apply the pre-formed bitumen parts to the complex-shaped or almost inaccessible metal sheet parts of machines or vehicles, e.g., the inner surfaces of the cavities of motor vehicle doors. In addition, there is the further disadvantage that in many cases several punched parts are required for only one vehicle or appliance and therefore costly storage is required.

There has consequently been no lack of attempts to eliminate the disadvantages of bitumen sheets using other polymer systems. For example, aqueous polymer dispersions of polyvinylacetate or ethylene-vinylacetate copolymers containing fillers were developed which can be sprayed on to the metal sheet parts with the necessary coating thickness. These systems are, however, disadvantageous for industrial use when there are high rates of production because the water cannot be removed rapidly enough from the coating that is sprayed on, particularly when this coating is fairly thick.

The sound damping properties of polymer coatings are best in the range of the glass transition temperature of the polymer system, because due to the viscoelasticity of the polymer in this temperature range the mechanical energy of the vibration process is converted into heat by molecular flow phenomena. Conventional sprayable coating materials based on PVC plastisols, which, e.g., are widely used as an underbody coating in motor vehicle construction, have no notable sound damping effect in the application temperature range of −20 to +60° C. because the maximum value of the glass transition is about −20° C. to −50° C., depending on the proportion of plasticizer.

Attempts were therefore made to modify these conventional PVC plastisols so that they would have better sound damping properties in the application temperature range of −20° C. to +60° C. Coatings are known from German published patent application 3514753 which contain multiply unsaturated compounds, e.g., di- or triacrylates, peroxide cross-linking agents and inorganic fillers, in conventional PVC plastisols. In the hardened state these plastisols are, however, glass-hard and brittle, and are therefore not really suitable for use in automobile construction because they do not have sufficient flexibility, particularly at low temperatures. Apart from this, these formulations have a very low loss factor tan δ and thus the sound damping effect is not very marked.

Compositions are described in German published patent application 3444863 which contain PVC or vinylchloride/vinylacetate copolymers, optionally methylmethacrylate homopolymers or copolymers, a plasticizer mixture and inert fillers. The plasticizer mixture comprises plasticizers which are compatible with the methylmethacrylate polymers and plasticizers for the vinylchloride polymers which are incompatible with the methylmethacrylate polymers which may be present. The plastisols thus obtained have improved sound damping properties compared with conventional PVC plastisols. However, particularly at temperatures above about 30° C., the sound damping effect drops again. If an attempt is made to shift the range of the maximum loss factor tan δ to higher temperatures by varying the relative quantities of the individual components, the cold flexibility of the coating drops very severely. A reduced cold flexibility is, however, precisely what is disadvantageous in vehicle construction. In addition, the loss factor decreases very severely at lower temperatures with these formulations. These plastisol compositions therefore have a sufficiently high loss factor only in a very narrow temperature range.

Furthermore, active measures for reducing structure borne noise have been developed. These measures usually employ sensors, signal processing, actuators, and power sources to counteract or effectively increase the dissipation of the vibration by producing corresponding forces or strains.

Although active control measures have been shown to effectively reduce structure borne noise, they require sophisticated technical equipment, especially with respect to signal processing and sensors. This does not only increase the costs, but also leads to an increased risk of breakdown.

Therefore, there is a need for an economic means for effectively reducing structure borne noise in a system, especially in a vehicle.

It is therefore an object of the present invention to overcome the drawbacks of the prior art.

BRIEF SUMMARY OF THE INVENTION

After long and extensive research work the inventors have now found that effective reduction of structure borne noise in a system such as a vehicle may be achieved by way of a particular dissipative vibratory wave barrier, a particular thermally expandable material useful for the manufacture of said dissipative vibratory wave barrier, and a method employing said dissipative vibratory wave barrier.

The dissipative vibratory wave barrier according to the present invention comprises a carrier having an inner surface and an outer surface, the carrier having a polygonal section, especially rectangular, optionally U-shaped, and comprising on at least one of its outer surface or its inner surface a coating comprising a thermally expandable material selected among those which, after expansion and at a temperature between −10 and +40° C., have a Young's storage modulus E' between 0.1 MPa and 1000 MPa, preferably a loss modulus E" between 0.5 and 1, a loss factor greater than 0.3 (preferably, greater than 1) and preferably also a shear storage modulus G' between 0.1 MPa and 500 MPa in the frequency range 0 to 500 Hz.

DETAILED DESCRIPTION OF CERTAIN EMBODIMENTS OF THE INVENTION

As previously mentioned, the thermally expandable material to be used in combination with a carrier is selected among those which, after expansion and at a temperature between −10 and +40° C., have a Young's storage modulus E' between 0.1 MPa and 1000 MPa, preferably a loss modulus E" between 0.5 and 1, a loss factor greater than 0.3 (preferably, greater than 1) and preferably also a shear storage modulus G' between 0.1 MPa and 500 MPa in the frequency range 0 to 500 Hz.

Young's storage modulus (E') is defined as the ratio of tensile stress to tensile strain below the proportional limit of a material. Shear storage modulus G' is defined as the ratio of shearing stress to shearing strain within the proportional limit and is considered a measure of the equivalent energy stored elastically in a material. The loss factor (also sometimes referred to as the structural intrinsic damping or tan delta) is the ratio of the Young's loss modulus E" over Young's storage modulus E' for the damping in tension compression. For the damping in shear, the loss factor is the ratio of the shear loss modulus G" over the shear storage modulus G'. These values may be readily determined by Dynamic Mechanical Analysis (DMA) of a material, which in the context of this invention is the thermally expandable material after expansion. As is well known in the art, Dynamic Mechanical Analysis can be performed either by an indirect method where the material is characterized on a carrier (Oberst's beam test) or by a direct method where the tested sample is made only from the material to be characterized (viscoanalyzer).

The carrier selected for use in the present invention has an inner surface and an outer surface. In cross-section, the carrier should be polygonal in shape. Preferably, the cross-sectional shape of the carrier has at least three sides that are straight lines and/or arcs. In one embodiment, the carrier is open or partially open on one side, but in another embodiment the cross-sectional shape of the carrier is closed. For example, the carrier in cross-section may have a shape selected from the group consisting of rectangular, square, pentagonal, hexagonal, U-shaped, and D-shaped. The sides of the carrier may be equal or different in length, with the lengths of the sides generally being selected in accordance with the interior dimensions of the structural element into which the dissipative vibratory wave barrier is to be inserted or the exterior dimensions of the structural element onto which the dissipative vibratory wave barrier is to be fixed. The carrier may be completely hollow, but in certain embodiments could have one or more interior elements such as braces, ribs, cross-walls and the like. The carrier may be designed with small tabs, legs or other protrusions on its surface(s) or edge(s) that will face the bottom of the hollow structural element into which the dissipative vibratory wave barrier is to be inserted. These protrusions are configured to hold such surface(s) or edge(s) away from the lower interior surface of the structural element, thereby allowing any of the liquids used in vehicle assembly operations to more completely coat or contact such lower interior surface. In the embodiment where the dissipative vibratory wave barrier is fixed onto the outside of the structural element, the surface of the barrier having the coating of thermally expandable material positioned thereon and facing the exterior surface of the surface element may be similarly held a relatively short distance away from such exterior surface by any suitable positioning means such as spacer elements, clips, flanges and the like.

In one embodiment of the invention, the carrier is straight. In other embodiments, however, the carrier may be bent or curved. In still other embodiments, the carrier may be straight in certain sections and curved in other sections. Each side of the carrier may be planar (flat), but it is also possible for a side of the carrier to be non-planar (e.g., curved or containing one or more indented areas and/or one or more protruding sections). The carrier sides may be continuous (free of any openings), but in certain embodiments one or more sides of the carrier could contain one or more openings. Generally speaking, the shape and configuration of the carrier are selected so as to generally parallel or match the contours or shape of the structural element into which the dissipative vibratory wave barrier is to be inserted or onto which the dissipative vibratory wave barrier is to be fixed and to clear any elements within the structural element or on the exterior of the structural element that might otherwise prevent the dissipative vibratory wave barrier, once coated with the thermally expandable material, from fitting within or onto such structural element. As will be explained in more detail subsequently, it will be desirable to allow at least some clearance room between the outer surfaces of the dissipative vibratory wave barrier and the inner surfaces of the structural element (in the embodiment where the barrier is to be inserted into the structural element) or between the inner surfaces of the dissipative vibratory wave barrier and the outer surfaces of the structural element (in the embodiment where the barrier is to be fixed onto the outside of the structural element.

The carrier may be made of metal. Preferred metals are steel, particularly galvanized steel, and aluminum.

The carrier may also be made of a synthetic material, which may optionally be fiber reinforced (e.g., with glass fibers) and/or reinforced with other types of fillers. Preferred synthetic materials are thermoplastic synthetic materials having a low water absorption and dimensionally stable up to at least 180° C. Suitable thermoplastic synthetic materials may, for example, be selected within the group consisting of polyamides (PA), polyphenylene sulphides (PPS), polyphenylene ethers (PPE), polyphenylene sulfones (PPSU), polyether imides (PEI) and polyphenylene imides (PPI). Thermoset synthetic materials such as molding compounds, rigid polyurethanes, and the like may also be used to construct the carrier. The carrier may be formed into the desired shape by any suitable method, such as, for example, molding (including injection molding), stamping, bending, extrusion and the like.

Preferably, the carrier is relatively stiff. In one embodiment, the carrier is at least as stiff at room temperature as the structural element into which the dissipative vibratory wave barrier will be inserted or onto which the dissipative vibratory wave barrier will be fixed.

In the embodiment where the dissipative vibratory wave barrier is to be inserted into the structural element, the coating is applied to at least a part of the outer surface of the carrier but may also be applied to the whole outer surface. Similarly, in the embodiment where the dissipative vibratory wave barrier is to be fixed onto the structural element, the coating is applied to at least a part of the inner surface of the carrier but may also be applied to the whole inner surface. The coating of thermally expandable material may be continuous, although the present invention also contemplates having two or more separate portions of the thermally expanded material on the outer or inner surface of the carrier. These portions may differ in size, shape, thickness, etc.

The coating comprising the thermally expandable material may be uniform in thickness, but may also be varied in thickness over the outer or inner surface of the carrier. Typically, the coating will be from 0.5 to 10 mm thick.

The thermally expandable material is a material that will foam and expand upon heating but that is typically solid (and preferably dimensionally stable) at room temperature (e.g., 15-30 degrees C.). In some embodiments, the expandable material will be dry and non-tacky, but in other embodiments will be tacky. The thermally expandable material preferably is formulated such that it is capable of being shaped or molded (e.g., by injection molding or extrusion) into the desired form for use, such shaping or molding being carried out at a temperature above room temperature that is sufficient to soften or melt the expandable material so that it can be readily processed but below the temperature at which expansion of the expandable material is induced. Cooling the shaped or molded expandable material to room temperature yields a dimensionally stable solid having the desired shape or form. Upon activation of the blowing agent, i.e., upon being subjected to a temperature of between about 130° C. and 240° C. (depending on the exact formulation of expandable material that is used), the expandable material will typically expand to at least about 100% or at least about 150% or alternatively at least about 200% of its original volume. Even higher expansion rates (e.g., at least about 1000%) may be selected where required by the desired end use. When used in an automobile body, for example, the expandable material typically has an activation temperature lower than the temperature at which primer or paint is baked on the vehicle body during manufacture.

The thermally expandable material may be applied to the carrier surface by any suitable means such as extrusion, co-molding, over-molding, or the like. For example, the thermally expandable material may be heated to a temperature sufficient to soften or melt the material without activating the blowing agent or curing agent that may be present and the softened or melted material then extruded as a ribbon onto the outer or inner carrier surface. Upon cooling, the ribbon of thermally expandable material then re-solidifies and adheres to the carrier surface. Alternatively, sheets of the thermally expandable material may be formed into individual portions of the desired size and shape by die-cutting, with the individual portions then being attached to the outer or inner surface of the carrier by any suitable means such as mechanical fasteners or heating the surface of the portion that is to be contacted with the carrier surface to a temperature sufficient for the expandable material to function as a hot melt adhesive. A separately applied adhesive layer may also be used to attach the thermally expandable material to the outer or inner surface of the carrier.

In an especially advantageous embodiment, the thermally expandable material comprises:

from 25 to 70% by weight, preferably from 35 to 55% by weight, of at least one thermoplastic elastomer (preferably a styrene/butadiene or styrene/isoprene block copolymer or at least partially hydrogenated derivative thereof);

from 15 to 40% by weight, preferably from 20 to 35% by weight, of at least one non-elastomeric thermoplastic (preferably an ethylene/vinyl acetate or ethylene/methyl acrylate copolymer);

from 0.01 to 2% by weight, preferably from 0.05 to 1% by weight, of at least one stabilizer or antioxidant;

from 2 to 15% by weight of at least one blowing agent, preferably an amount effective to cause the expandable material to expand at least 100% in volume when heated at a temperature of 150 degrees C.;

from 0.5 to 4% by weight of one or more curing agents, optionally including from 0.5 to 2% by weight of at least one olefinically unsaturated monomer or oligomer, and optionally;

up to 10% by weight (e.g., 0.1 to 10% by weight) of at least one tackifying resin;

up to 5% by weight (e.g., 0.1 to 5% by weight) of at least one plasticizer;

up to 10% by weight (e.g., 0.1 to 10% by weight) of at least one wax;

up to 3% by weight (e.g., 0.05 to 3% by weight) of at least one activator for the blowing agent;

as well as optionally at least one filler (although the amount of filler is preferably less than 10% by weight, more preferably less than 5% by weight), the percentages being expressed as weight percentages of the total weight of the thermally expandable material.

Generally speaking, it will be desirable to use a thermoplastic elastomer that has a softening point no higher than the temperature at which the blowing agent begins to be activated, preferably at least about 30 degrees C. lower than the temperature that the expandable material will be exposed to when it is to be expanded. The thermoplastic elastomer is preferably selected within the group consisting of thermoplastic polyurethanes (TPU) and block copolymers (including linear as well as radial block copolymers) of the A-B, A-B-A, A-$(B-A)_{n-2}$-B, A-$(B-A)_{n-1}$ and $(A-B)_n$-Y types, wherein A is an aromatic polyvinyl ("hard") block and the B block represents a rubber-like ("soft") block of polybutadiene, polyisoprene or the like, which may be partly or completely hydrogenated, Y is a polyfunctional compound and n is an integer of at least 3. The blocks may be tapered or gradient in character or consist entirely of one type of polymerized monomer.

Hydrogenation of the B block removes originally present double bonds and increases the thermal stability of the block copolymer. Such copolymers may be preferred in certain embodiments of the present invention.

Suitable block copolymers include, but are not limited to, SBS (styrene/butadiene/styrene) copolymers, SIS (styrene/ isoprene/styrene) copolymers, SEPS (styrene/ethylene/propylene/styrene) copolymers, SEEPS (styrene/ethylene/ethylene/propylene/styrene) or SEBS (styrene/ethylene/butadiene/styrene) copolymers.

Especially suitable block copolymers include styrene/isoprene/styrene triblock polymers, as well as fully or partially hydrogenated derivatives thereof, in which the polyisoprene block contains a relatively high proportion of monomer moieties derived from isoprene having a 1,2 and/or 3,4 configuration. Preferably, at least about 50% of the polymerized isoprene monomer moieties have 1,2 and/or 3,4 configurations, with the remainder of the isoprene moieties having a 1,4 configuration. Such block copolymers are available from Kuraray Co., Ltd. under the trademark HYBRAR and may also be prepared using the methods described in U.S. Pat. No. 4,987,194, incorporated herein by reference in its entirety.

In certain preferred embodiments of the invention the "hard" blocks represent from about 15 to about 30 percent by weight of the block copolymer and the "soft" blocks represent from about 70 to about 85 percent by weight of the block copolymer. The glass transition temperature of the "soft" blocks is preferably from about −35 degrees C. to about 10 degrees C. while the glass transition temperature of the "hard" blocks is preferably from about 90 degrees C. to about 110 degrees C. The melt flow index of the block copolymer preferably is from about 0.5 to about 6 (as measured by ASTM D1238, 190 degrees C., 2.16 Kg). Typically, the block copolymer will have a number average molecular weight of from about 30,000 to about 300,000.

Examples of suitable thermoplastic polyurethanes (TPU) are those made according to conventional processes by reacting diisocyanates with compositions having at least two isocyanate reactive groups per molecule, preferably difunctional alcohols. Suitable organic diisocyanates to be used include, for example, aliphatic, cycloaliphatic, araliphatic, heterocyclic and aromatic diisocyanates.

Specific examples of diisocyanates include aliphatic diisocyanates such as, for example, hexamethylene-diisocyanate; cycloaliphatic diisocyanates such as, for example, isophorone- diisocyanate, 1,4-cyclohexane-diisocyanate, 1-methyl-2,4- and -2,6-cyclohexane-diisocyanate and the corresponding isomer mixtures, 4,4'-, 2,4'- and 2,2'-dicyclohexylmethane-diisocyanate and the corresponding isomer mixtures; and aromatic diisocyanates such as, for example, 2,4-toluylene-diisocyanate, mixtures of 2,4- and 2,6-toluylene-diisocyanate, 4,4'-diphenylmethane-diisocyanate, 2,4'-diphenylmethane-diisocyanate and 2,2'-diphenylmethane-diisocyanate, mixtures of 2,4'-diphenylmethane-diisocyanate and 4,4'-diphenylmethane-diisocyanate, urethane-modified liquid 4,4'-diphenylmethane-diisocyanates and/or 2,4'-diphenylmethane-diisocyanates, 4,4'-diisocyanato-1,2-diphenyl-ethane and 1,5-naphthylene-diisocyanate. Diphenylmethane-diisocyanate isomer mixtures with a 4,4'-diphenylmethane-diisocyanate content of greater than 96 wt. % are preferably used, and 4,4'-diphenylmethane-diisocyanate and 1,5-naphthylene-diisocyanate are used in particular. The diisocyanates mentioned above can be used individually or in the form of mixtures with one another.

The compounds reactive with the isocyanate groups include, but are not limited to, polyhydroxy compounds such as polyester polyols, polyether polyols or polycarbonate-polyols or polyols which may contain nitrogen, phosphorus, sulfur and/or silicon atoms, or mixtures of these. Linear hydroxyl-terminated polyols having on average from about 1.8 to about 3.0 Zerewitinoff-active hydrogen atoms per molecule, preferably from about 1.8 to about 2.2 Zerewitinoff-active hydrogen atoms per molecule, and having a number average molecular weight of 400 to 20,000 g/mol are preferably employed as polyol. These linear polyols often contain small amounts of non-linear compounds as a result of their production. Thus, these are also often referred to as "substantially linear polyols".

The polyhydroxy compounds with two or three hydroxyl groups per molecule in the number average molecular weight range of 400 to 20,000, preferably in the range of 1000 to 6000, which are liquid at room temperature, glassy solid/amorphous or crystalline, are preferably suitable as polyols. Examples are di- and/or trifunctional polypropylene glycols; random and/or block copolymers of ethylene oxide and propylene oxide can also be used. Another group of polyethers that can preferably be used are the polytetramethylene glycols (poly(oxytetramethylene) glycol, poly-THF), which are produced, e.g., by the acid polymerization of tetrahydrofuran, the number average molecular weight range of these polytetramethylene glycols typically lying between 600 and 6000, preferably in the range of 800 to 5000.

The liquid, glassy amorphous or crystalline polyesters that can be produced by condensation of di- or tricarboxylic acids, such as, e.g., adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid, dimerized fatty acid or mixtures thereof with low molecular-weight diols or triols, such as, e.g., ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimerized fatty alcohol, glycerin, trimethylolpropane or mixtures thereof, are also suitable as polyols.

Another group of polyols to be used for making the TPU's are polyesters based on ϵ-caprolactone, also known as "polycaprolactones".

However, polyester polyols of oleochemical origin can also be used. These polyester polyols can be produced, for example, by the complete ring opening of epoxidized triglycerides of an at least partially olefinically unsaturated, fatty acid-containing fat mixture with one or more alcohols with 1 to 12 C atoms and subsequent partial transesterification of the triglyceride derivatives to alkyl ester polyols with 1 to 12 C atoms in the alkyl radical. Other suitable polyols are polycarbonate polyols and dimerized diols (Henkel), as well as castor oil and its derivatives. The hydroxy-functional polybutadienes, as obtainable, for example, with the trade name "Poly-bd", can be used as polyols for making the TPU's to be used according to the invention.

Preferably, combinations of polyether polyols and glassy amorphous or crystalline polyester polyols are used for making the TPU's.

Preferably, the polyols have an average functionality towards isocyanate from about 1.8 to 2.3, preferably 1.9 to 2.2, particularly about 2.0.

The thermoplastic polyurethanes may also be made by additionally using chain extending compounds like low molecular weight polyols such as ethylene glycol, propylene glycol or butadiene glycol or low molecular weight diamines such as 1,2-diaminoethylene, 1,3-diaminopropylene or 1,4-diaminobutane or 1,6-diaminohexane.

In preferred embodiments, the soft domains of the thermoplastic polyurethane are selected from the group consisting of poly(ethylene adipate), poly(1,4-butene adipate), poly(ethylene 1,4-butene adipate), poly(hexamethylene 2,2- dimethylpropylene adipate), polycaprolactone, poly(diethylene glycol adipate), poly(1,6-hexanediol carbonate) and poly(oxytetramethylene).

Other thermoplastic elastomers suitable for use in the present invention include other types of block copolymers containing both hard segments and soft segments such as, for example, polystyrene/polydimethylsiloxane block copolymers, polysulfone/polydimethylsiloxane block copolymers, polyester/polyether block copolymers (e.g., copolyesters such as those synthesized from dimethyl terephthalate, poly(tetramethylene ether) glycol, and tetramethylene glycol), polycarbonate/polydimethylsiloxane block copolymers, polycarbonate/polyether block copolymers, copolyetheramides, copolyetheresteramides and the like. Thermoplastic elastomers which are not block copolymers but which generally are finely interdispersed multiphase systems or alloys may also be used, including blends of polypropylene with ethylene-propylene rubbers (EPR) or ethylene-propylene-diene monomer (EPDM) rubbers (such blends often being grafted or cross-linked).

In addition to one or more thermoplastic elastomers, it is also preferred for the expandable material to contain one or more non-elastomeric thermoplastics. Preferably, the non-elastomeric thermoplastic is selected so as to improve the adhesion properties and processability of the expandable material. Generally speaking, it will be desirable to use a non-elastomeric thermoplastic that has a softening point no higher than the temperature at which the blowing agent begins to be activated, preferably at least about 30 degrees C. lower than the temperature that the expandable material will be exposed to when such material is to be expanded. Particularly preferred non-elastomeric thermoplastics include olefin polymers, especially copolymers of olefins (e.g., ethylene) with non-olefinic monomers (e.g., vinyl esters such as vinyl acetate and vinyl propionate, (meth) acrylate esters such as C1 to C6 alkyl esters of acrylic acid and methacrylic acid). Exemplary non-elastomeric thermoplastics especially suitable for use in the present invention include ethylene/vinyl acetate copolymers (particularly copolymers containing from about 20 to about 35 weight % vinyl acetate) and ethylene/methyl acrylate copolymers (particularly copolymers containing from about 15 to about 35 weight % methyl acrylate and/or having Vicat softening points less than 50 degrees C. and/or melting points within the range of 60 to 80 degrees C. and/or melt flow indices of from 3 to 25 g/10 minutes, as measured by ASTM D1238, 190 degrees C., 2.16 Kg).

In certain embodiments of the invention, the weight ratio of thermoplastic elastomer: non-elastomeric thermoplastic is at least 0.5:1 or at least 1:1 and/or not greater than 5:1 or 2.5:1.

The tackifying resin may be selected within the group consisting of rosin resins, terpene resins, terpene phenolic resins, hydrocarbon resins derived from cracked petroleum distilllates, aromatic tackifying resins, tall oil resins, ketone resins and aldehyde resins.

Suitable rosin resins are abietic acid, levopimaric acid, neoabietic acid, dextropimaric acid, palustric acid, alkyl esters of the aforementioned rosin acids, and hydrogenation products of rosin acid derivatives.

Examples of suitable plasticizers include $C_{1-10}$ alkyl esters of dibasic acids (e.g., phthalate esters), diaryl ethers, benzoates of polyalkylene glycols, organic phosphates, and alkylsulfonic acid esters of phenol or cresol.

Suitable waxes include paraffinic waxes having melting ranges from 45 to 70° C., microcrystalline waxes with melting ranges from 60 to 95° C., synthetic Fischer-Tropsch waxes with melting points between 100 and 115° C. as well as polyethylene waxes with melting points between 85 and 140° C.

Suitable antioxidants and stabilizers include sterically hindered phenols and/or thioethers, sterically hindered aromatic amines and the like.

All known blowing agents, such as "chemical blowing agents" which liberate gases by decomposition or "physical blowing agents", i.e., expanding hollow beads (also sometimes referred to as expandable microspheres), are suitable as blowing agent in the present invention. Mixtures of different blowing agents may be used to advantage; for example, a blowing agent having a relatively low activation temperature may be used in combination with a blowing agent having a relatively high activation temperature.

Examples of "chemical blowing agents" include azo, hydrazide, nitroso and carbazide compounds such as azobisisobutyronitrile, azodicarbonamide, di-nitroso-pentamethylenetetramine, 4,4'-oxybis(benzenesulfonic acid hydrazide), diphenyl-sulfone-3,3'-disulfohydrazide, benzene-1,3-disulfohydrazide and p-toluenesulfonyl semicarbazide.

"Chemical blowing agents" may benefit from the incorporation of additional activators such as zinc compounds (e.g., zinc oxide), (modified) ureas and the like.

However, "physical blowing agents" and particularly expandable hollow microbeads are also useable. Advantageously, the hollow microbeads are based on polyvinylidene chloride copolymers or acrylonitrile/(meth)acrylate copolymers and contain encapsulated volatile substances such as light hydrocarbons or halogenated hydrocarbons.

Suitable expandable hollow microbeads are commercially available, e.g., under the trademarks "Dualite" and "Expancel" respectively, from Pierce & Stevens (now part of Henkel Corporation) or Akzo Nobel, respectively.

Suitable curing agents include substances capable of inducing free radical reactions, in particular organic peroxides including ketone peroxides, diacyl peroxides, peresters, perketals, hydroperoxides and others such as cumene hydroperoxide, bis(tert-butylperoxy) diisopropylbenzene, di(-2-tert-butyl peroxyisopropyl benzene), 1,1-di-tert-butylperoxy-3,3,5-trimethylcyclohexane, dicumyl peroxide, t-butylperoxybenzoate, di-alkyl peroxydicarbonates, di-peroxyketals (such as 1,1-di-tert-butylperoxy-3,3,5-trimethylcyclohexane), ketone peroxides (e.g., methylethylketone peroxide), and 4,4-di-tert-butylperoxy n-butyl valerate. The curing agent is preferably a latent curing agent, that is, a curing agent that is essentially inert or non-reactive at room temperature but is activated by heating to an elevated temperature (for example, a temperature within the range of from about 130 degrees C. to about 240 degrees C.).

In a particularly desirable embodiment, the thermally expandable composition contains a small amount (e.g., 0.1 to 5 weight percent or 0.5 to 2 weight percent) of one or more olefinically unsaturated monomers and/or oligomers such as $C_1$ to $C_6$ alkyl (meth)acrylates (e.g., methyl acrylate), unsaturated carboxylic acids such as (meth)acrylic acid, unsaturated anhydrides such as maleic anhydride, (meth)acrylates of polyols and alkoxylated polyols such as glycerol triacrylate, ethylene glycol diacrylate, triethylene glycol diacrylate, trimethylolpropane triacrylate (TMPTA) and the like, triallyl trimesate, triallyl trimellitate (TATM), tetraallyl pyromellitate, the diallyl ester of 1,1,3,-trimethyl-5-carboxy-3-(4-carboxyphenyl)indene, dihydrodicyclo pentadienyl acrylate, trimethylolpropane trimellitate (TMPTM), pentaerythritol trimethacrylate, phenylene-dimaleimide, tri (2-acryloxyethyl)isocyanurate, triallyl isocyanurate (TAIC), triallyl cyanurate (TAC), tri(2-methacryloxyethyl)trimellitate, unsaturated nitriles such as (meth)acrylonitrile, vinyl compounds (including vinyl aromatic compounds such as styrene), allyl compounds and the like and combinations thereof. In one embodiment, the olefinically unsaturated monomer(s) and/or oligomer(s) used contain only one carbon-carbon double bond per molecule (i.e., the monomer or oligomer is monofunctional with respect to olefinically unsaturated functional groups). Preferably, the monomer(s) and/or oligomer(s) are selected to be capable of undergoing free radical reaction (e.g., oligomerization or polymerization) initiated by the curing agent(s) present in the expandable material when the expandable material is heated to a temperature effective to activate the curing agent (for example, by thermal decomposition of a peroxide).

Examples of suitable fillers include ground and precipitated chalks, talc, calcium carbonate, carbon black, calcium-magnesium carbonates, barite and silicate fillers of the aluminium-magnesium-calcium type, such as wollastonite and chlorite. Preferably, however, the total amount of filler is limited to less than 10% by weight, more preferably less than 5% by weight. In one embodiment, the expandable material contains no filler (defined herein as substantially inorganic particles, such as particles of the materials mentioned above).

In certain embodiments of the invention, the components of the thermally expandable material are selected such that the expandable material is free or substantially free of any thermosettable resin such as an epoxy resin (e.g., the expandable material contains less than 5% or less than 1% by weight epoxy resin).

Expansion of the thermally expandable material is achieved by a heating step, wherein the thermally expandable material is heated for a time and at a temperature effective to activate the blowing agent and also any curing agent that may be present.

Depending on the nature of the thermally expandable material and the line conditions at the assembly line, the heating step is typically carried out at a temperature from 130° C. to 240° C., preferably from 150° C. to 200° C., with a residence time in the oven from about 10 min. to about 30 min.

It is advantageous to take benefit of the heating step that follows the passage of the vehicle parts in the generally used electro coating bath (E-coat bath) to cause expansion of the thermally expandable material as the temperature during this heating step is generally sufficient to cause the expected expansion.

The present invention also relates to a method for reducing the transfer of vibrations from a vibration generator to a location to which the vibration generator is connected via a structural element, comprising equipping said structural element with means for dissipating vibrational energy generated by the vibration generator, characterized in that the means for dissipating vibrational energy comprises a dissipative vibratory wave barrier according to the present invention as described here above.

Examples of vibration generators include motors, engines, pumps, gear boxes, suspension dampers and springs.

The method according to the present invention is particularly adapted for reducing structure borne noise in an automobile vehicle. In this case the vibration generator is connected to at least one of the constitutive parts of the passenger compartment of said vehicle via a structural element. The shape of the structural element is that of a tubular rail with a polygonal, preferably rectangular, cross-section.

The method according to the present invention comprises successively:
selecting a dissipative vibratory wave barrier according to the present invention having dimensions such that it can be inserted into the structural element or fixed onto the structural element;
inserting the dissipative vibratory wave barrier into the structural element or fixing the dissipative vibratory wave barrier onto the structural element in a location close to the vibration generator; and
expanding the thermally expandable material.

Advantageously, the dissipative vibratory wave barrier is selected such that a clearance of about 1 to 10 mm between the outer surfaces of the dissipative vibratory wave barrier and the inner surfaces of the structural element (in the embodiment where the barrier is inserted into the structural element) or between the inner surface(s) of the dissipative vibratory wave barrier and the outer surface(s) of the structural element (in the embodiment where the barrier is fixed onto the outside of the structural element) is obtained. Such an arrangement is desirable as it allows liquids such as cleaning baths, conversion coating baths and electro coating (e-coat) baths to freely contact the inner and outer surfaces of the structural element. The inner and outer surfaces thus can be easily treated with such liquids after introduction of the dissipative vibratory wave barrier and prior to expansion of the coating of thermally expandable material.

In another advantageous embodiment the cross-section of the dissipative vibratory wave barrier has the same shape as the cross-section of the structural element. For example, if the structural element has a rectangular cross-section with an interior length l and an interior width w, the exterior dimensions of the dissipative vibratory wave barrier (where the barrier is to be inserted into the structural element) will be l and w minus two times the clearance necessary for the expanding material. The longitudinal length of the dissipative vibratory wave barrier generally should be selected so that it is no longer than the length of the structural element into which the wave barrier is to be inserted or onto which the wave barrier is to be fixed. Typically, the dissipative vibratory wave barrier has a longitudinal length that is at least as long as the longest cross-sectional dimension of the carrier, e.g., at least two or at least three times the length of the longest cross-sectional dimension of the carrier. Longer lengths will permit a greater quantity of the thermally expandable material to be introduced between the structural element and the carrier, but generally for cost and weight reasons the quantity of such material used is preferably not significantly in excess of the amount needed to achieve the desired extent of vibration transfer reduction.

The dissipative vibratory wave barrier is preferably inserted into the structural element or fixed onto the structural element as close as possible to the vibration generator and before the receiving vibrating structure from which the sound is generated. If desired, any suitable method may be used to physically attach the dissipative vibratory wave barrier to the structural element prior to activation of the thermally expandable material so that the barrier is secured in the desired position relative to the structural element, thereby preventing displacement of the barrier while the structural element is being subjected to further handling (as may be encountered in a vehicle assembly operation, for example). Such attachment may be accomplished, for example, through the use of mechanical fasteners such as clips, pins, screws, bolts, clamps and the like as well as through the use of flanges or tabs on one or both of the carrier and the structural element that are welded, riveted or adhesively attached so as to interconnect the carrier and the structural element. The dissipative vibratory wave barrier and the structural element may alternatively be configured in a cooperative manner so that gravitational and/or frictional forces alone are relied on to keep the barrier in place. For example, a U-shaped dissipative vibratory wave barrier that is to be fixed to the outside of a rectangular shaped structural element may be designed to have flanges extending inward on each side of the open end of the U-shaped carrier. When the dissipative vibratory wave barrier is fitted around the structural element, these flanges rest on the upper outer surface of the structural element, thereby allowing the barrier to hang from the structural element.

Expansion of the expandable material is obtained by a heating step.

Depending on the nature of the thermally expandable material and the line conditions at the assembly line, the heating step is typically carried out at a temperature from 130° C. to 240° C., preferably from 150° C. to 200° C. with a residence time in the oven from about 10 min. to about 30 min.

To cause expansion of the thermally expandable material, it is advantageous to take benefit of the heating step that follows the step of passing the vehicle parts containing the dissipative vibratory wave barrier through the generally used electro coating bath (E-coat bath), as the temperature during this heating step is generally sufficient to cause the desired expansion.

The amount of thermally expandable material that is applied to the carrier is selected such that, after expansion, its volume occupies the clearance between the carrier and the surface of the structural element that faces the carrier. The thermally expandable material may be formulated such that it adheres to the inner or outer surface of the structural element after expansion.

The hereindescribed dissipative vibratory wave barriers of the present invention can be used in any location within an automotive vehicle frame. For instance, such locations include, but are not limited to, pillars (including A, B, C and D pillars), rails, pillar to door regions, roof to pillar regions, mid-pillar regions, roof rails, windshield or other window frames, deck lids, hatches, removable top to roof locations, other vehicle beltline locations, motor (engine) rails, lower sills, rocker panel rails, support beams, cross members, lower rails, and the like.

Figure 1:
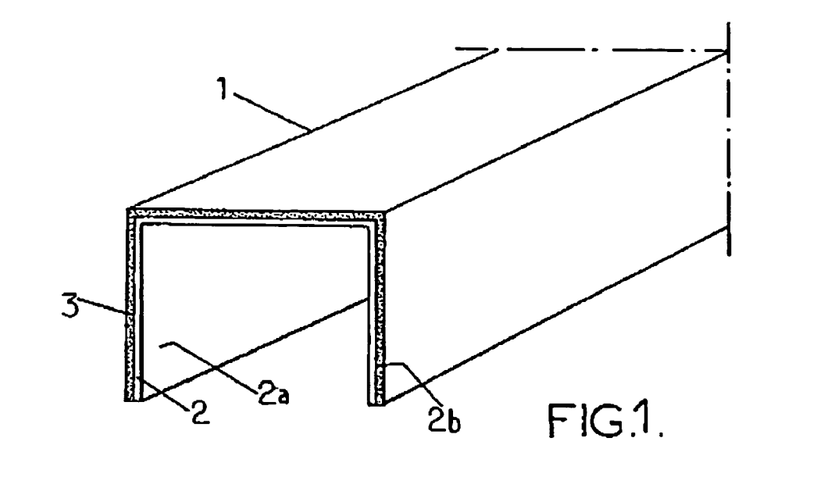
FIG. 1 is a schematic perspective view of a first embodiment of a dissipative vibratory wave barrier according to the present invention before expansion of the thermally expandable material.
Figure 2:
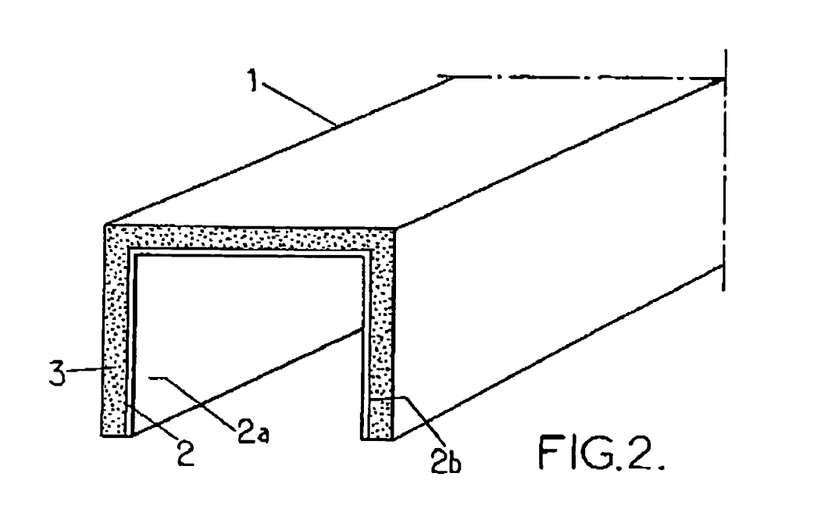
FIG. 2 is a schematic perspective view of the dissipative vibratory wave barrier of FIG. 1 after expansion of the thermally expandable material.
Figure 3:
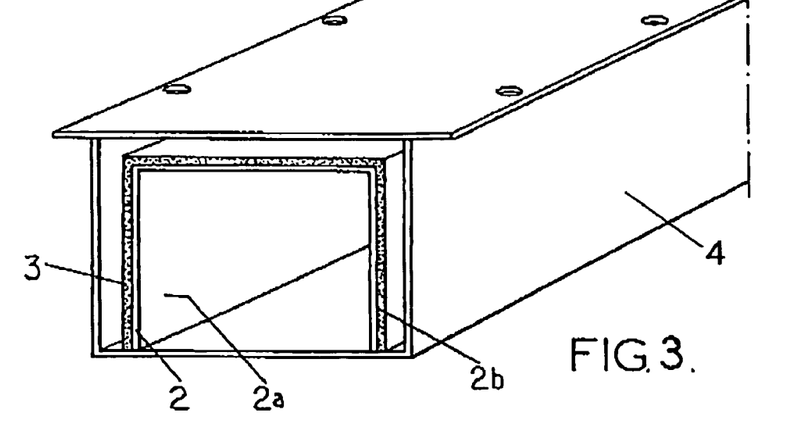
FIG. 3 is a schematic perspective view of the dissipative vibratory wave barrier of FIG. 1 after insertion into a structural element.
Figure 4:
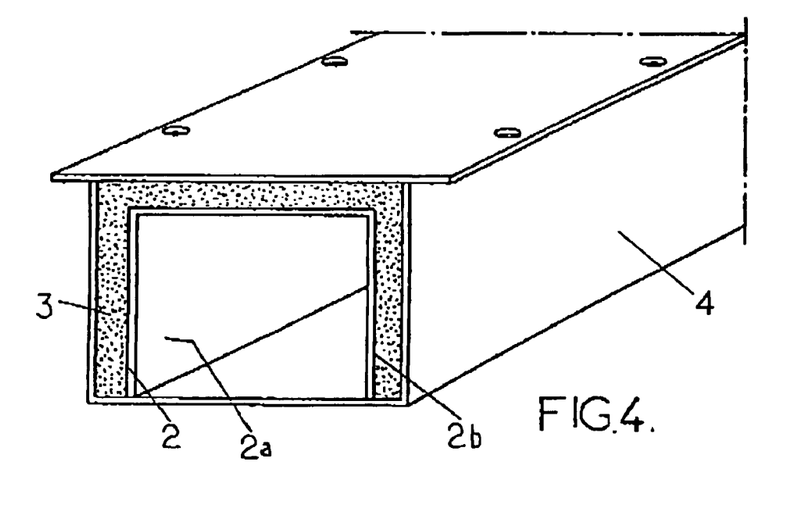
FIG. 4 is a schematic perspective view of the dissipative vibratory wave barrier of FIG. 3 after expansion of the thermally expandable material.
Figure 5:
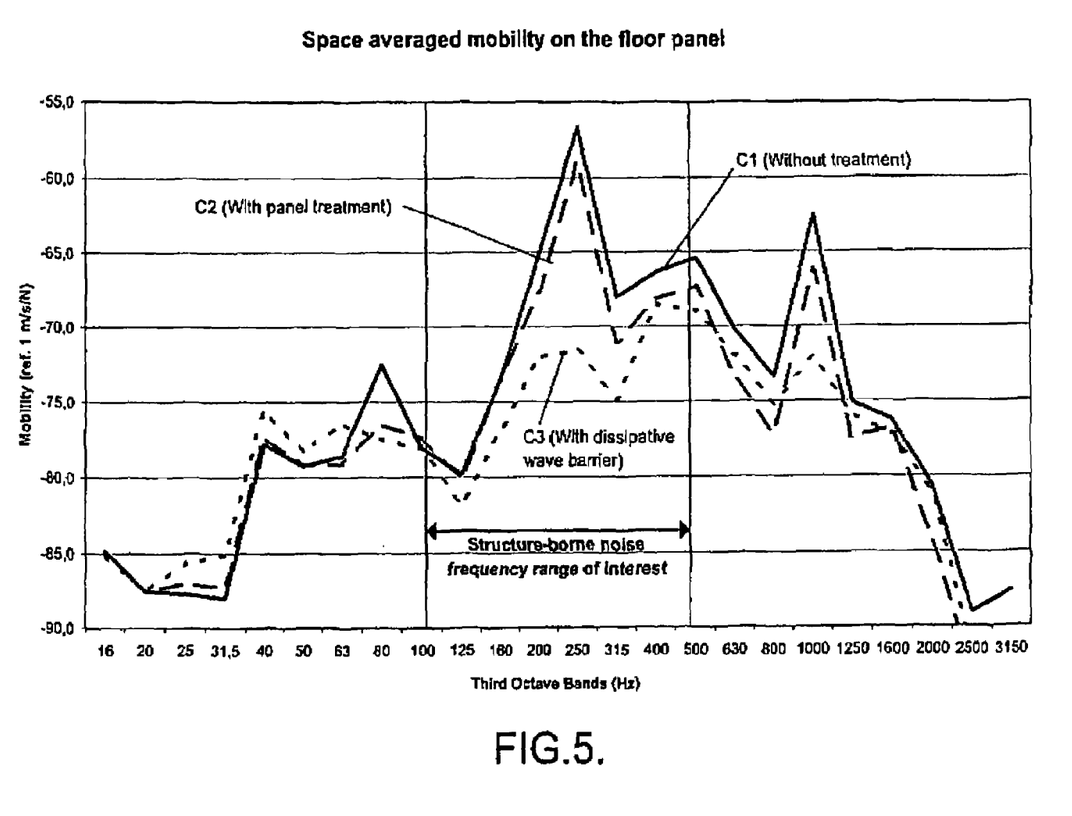
FIG. 5 is a graph showing three curves representing the variation of the structure borne noise in a car body as a function of frequency.

The above and other objects, features and advantages of the present invention will become more apparent from the following description of preferred embodiments, reference being made to the accompanying figures, in which:

FIG. 1 is a schematic perspective view of a first embodiment of a dissipative vibratory wave barrier according to the present invention before expansion of the thermally expandable material;

FIG. 2 is a schematic perspective view of the dissipative vibratory wave barrier of FIG. 1 after expansion of the thermally expandable material;

FIG. 3 is a schematic perspective view of the dissipative vibratory wave barrier of FIG. 1 after insertion into a structural element;

FIG. 4 is a schematic perspective view of the dissipative vibratory wave barrier of FIG. 3 after expansion of the thermally expandable material; and FIG. 5 is a graph showing three curves representing the variation of the structure borne noise in a car body as a function of frequency.

The dissipative vibratory wave barrier (1) shown in FIG. 1 comprises a U-shaped carrier (2) having an inner surface (2a) and an outer surface (2b). A coating (3) comprising a thermally expandable material is applied to the outer surface (2b). The initial thickness of the expandable material may be, for example, 0.5 to 10 mm, e.g., 2 mm.

The U-shaped carrier (2) is made of metal or of a synthetic material. Preferred metals are galvanized steel and aluminium.

When using a synthetic material, these may optionally be fiber reinforced. The synthetic materials may be selected from those previously recited. The thickness of the carrier (2) may be, for example, 0.2 to 5 mm, e.g., approximately 1 mm. Preferably, the thickness of the metal or synthetic material is selected so as to provide a carrier having a stiffness at least equal to the stiffness of the structural element to be combined with the dissipative vibratory wave barrier.

The following non-limiting example illustrates the invention and the manner of practicing the same.

As shown in FIG. 3, the dissipative vibratory wave barrier (1) is introduced into a structural element of a car body, for example into a front member (4) having a longitudinal shape such as a rail or pillar. The structural element may already be enclosed when the dissipative vibratory wave barrier is introduced; for example, the structural element may be a hydroformed pillar or rail or a pillar or rail that has been assembled by fastening together two or more sheet metal sections. Alternatively, the dissipative vibratory wave barrier may be introduced into a channel-shaped section. After inserting the dissipative vibratory wave barrier (1), the channel-shaped section may be enclosed or sealed to form the structural element by placing a plate (which may be flat or formed into a nonplanar shape) on the open side of the channel-shaped section, with the channel-shaped section and plate being preferably secured to each other by suitable attachment means such as welding, adhesive bonding, mechanical fasteners, or some combination thereof.

As shown in FIG. 3, the dissipative vibratory wave barrier may have a carrier (2) that is approximately rectangular having the same exterior dimensions as the front member (4) minus the clearance necessary for the expanding material (in this case minus 4 mm all around the carrier). The dissipative vibratory wave barrier may be placed loosely (i.e., without physical attachment) within the structural element or alternatively may be fixed in position using one or more attachment devices such as clips, pins, bolts, screws, and the like. For example, the edges of the carrier (2) which come into contact with an inner surface of the structural element (4) may have one or more clips extending therefrom which are inserted into openings or other receptacles in said inner surface, thereby holding the dissipative vibratory wave barrier in place. The clips may be configured such that the edges of the carrier (2) are positioned a small distance away from the bottom of the structural element, thereby allowing cleaning compositions, conversion coating compositions, paint or primer compositions or any of the other liquids typically used during vehicle assembly operations to more fully contact the inner surface of the structural element.

After the insertion of the dissipative vibratory wave barrier (1), the car body is heated to a temperature of 180° C. for 20 min in order to cause expansion of the thermally expandable material in the space between the outer surface of the carrier (2b) and the inner surface of the structural element. The activated dissipative vibratory wave barrier is illustrated in FIG. 4. After the heating, the coating of now-expanded expandable material has a thickness of 4 mm. The expansion can be realized during the passage of the vehicle parts through an oven following treatment of the parts in an electro coating bath.

In other examples, the dissipative vibratory wave barrier (1) can be selected such that the clearance between the outer surfaces of the dissipative vibratory wave barrier (1) and the inner surfaces of the structural element is about 1 to 10 mm. In all these cases, after the heating, the thermo-expandable material occupies all the clearance.

FIG. 5 shows the results of an experimentation carried out using a real car body. In this experiment, the dissipative vibratory wave barrier is located from the end of the front member and has a length of 52 cm.

A dynamic shaker is used as vibration generator and is attached at the free end of the front longitudinal member in form of a rail of the car body, with the dynamic shaker providing a wide band excitation in the frequency range from 20 Hz up to 2000 Hz.

The injected vibration is measured by means of a force sensor located at the entry point.

The response of the front floor and firewall panels to which the longitudinal member is connected is measured by means of accelerometers.

The spaced averaged mobility of the floor panels is calculated (m/s/N) in the frequency range from 20 Hz up to 2000 Hz.

A comparison of the vibration levels is given in FIG. 5 while using the proposed invention onto the vibration transfer path and using classical damping mats applied directly on the vibrating panels. The curves show the variation of the spaced averaged mobility as a function of frequency.

Three experiments are conducted:
without any added damping material on the vibrating panels and on the vibration transfer path (curve C1 on FIG. 5).
2.9 kg of conventional asphaltic damping mats are applied on the vibrating panels (front floor and firewall panels) (curve C2 on FIG. 5); this is the classical solution used on the studied car body to damp the vibration of the panels.
the dissipative vibratory wave barrier according to the invention as described below is used (curve C3 on FIG. 5).
The expandable material had the following composition:
45 parts by weight SIS block copolymer, styrene content 20%
5 parts by weight aromatic hydrocarbon resin as tackifier
2.5 parts by weight diisononylphthalate
4.5 parts by weight microcrystalline wax
27.5 parts by weight thermoplastic ethylene/vinyl acetate copolymer (28% vinyl acetate)
0.1 parts by weight phenolic antioxidant
8.8 parts by weight blowing agent (azodicarbonamide)
1.0 parts by weight 1,1-di-tert-butylperoxi-3,3,5-trimethylcyclohexane
0.5 parts by weight methylacrylate
1.5 parts by weight zinc oxide treated urea.

From curves C1 and C2, it appears that in the frequency range of structure borne noise between 100 Hz and 500 Hz, the spaced averaged mobility is reduced by an average of 5.0 dB. Since the spaced averaged mobility is directly proportional to the structure borne noise, noise reduction is also 44%.

By comparison of curves C3 and C2, it appears that in the frequency range of structure borne noise between 100 Hz and 500 Hz the spaced averaged mobility is reduced by an average of 1.4 dB, i.e. 15%.

The superiority of the solution proposed by the invention with respect to the most frequently used prior art solution (vibration dampers and dampening mats) clearly appears when comparing the reduction of noise obtained due to the invention, i.e., 44% and the reduction obtained when using the prior art solution, i.e., 15%.

The principal advantages of the invention are as follows:
much less material is necessary to damp the vibration of the vibrating panels;
the use of the dissipative vibratory wave barrier according to the invention is much cheaper in term of process costs for the car or machinery manufacturer compared to the application of damping material to the vibrating panels;
the ability to work on transmission paths requires a more in-depth analysis of the vehicle body structure but allows the solution to be tuned on a given excitation source or frequency range compared to a multi-purpose solution as the treatment of the panels;
the use of the dissipative vibratory wave barrier according to the invention may also contribute to the rigidity of the frame thus improving the safety and comfort of the vehicle, however a substantial contribution to the rigidity of the frame will always reduce the efficacy of the dissipative vibratory wave barrier property.

What is claimed is:

1. A dissipative vibratory wave barrier comprising a carrier having an inner surface and an outer surface, wherein a coating comprising a thermally expandable material is present on at least one of said inner surface or said outer surface and wherein said thermally expandable material, after expansion and at a temperature between −10 and +40° C., has a Young's storage modulus E' between 0.1 MPa and 1000 Mpa and a loss factor higher than 0.3 in the frequency range 0 to 500 Hz.

2. The dissipative vibratory wave barrier according to claim 1, wherein the carrier has a polygonal cross section.

3. The dissipative vibratory wave barrier according to claim 1, wherein the thermally expandable material comprises at least one thermoplastic elastomer, at least one non-elastomeric thermoplastic, at least one stabilizer or antioxidant, at least one blowing agent, and at least one curing agent.

4. The dissipative vibratory wave barrier according to claim 1, wherein the thermally expandable material, once expanded, has a loss factor higher than 1 in the frequency range 0 to 500 Hz at a temperature between −10 and +40° C.

5. The dissipative vibratory wave barrier according to claim 1, wherein the thermally expandable material comprises:
from 25 to 70% by weight of at least one thermoplastic elastomer;
from 15 to 40% by weight of at least one non-elastomeric thermoplastic;
from 0.01 to 2% by weight of at least one stabilizer or antioxidant;
from 2 to 15% by weight of at least one blowing agent;
from 0.5 to 4% by weight of at least one curing agent;
optionally, from 0.5 to 2% by weight of at least one olefinically unsaturated monomer;
optionally, up to 10% by weight of at least one tackifying resin;

optionally, up to 5% by weight of at least one plasticizer;
optionally, up to 10% by weight of at least one wax;
optionally, up to 3% by weight of at least one activator for the blowing agent; and
optionally, at least one filler;
the percentages being weight percentages of the total weight of the thermally expandable material.

6. A method for reducing the transfer of vibrations from a vibration generator to a location to which the vibration generator is connected via a structural element, comprising equipping said structural element with a means for dissipating the vibrational energy generated by the vibration generator, wherein said means comprises a dissipative vibratory wave barrier according to claim 1.

7. A vehicle comprising a vibration generator and a passenger compartment, wherein said vibration generator and a constitutive part of said passenger compartment are connected via a structural element having the form of a tubular rail with a polygonal cross-section and wherein a dissipative vibratory wave barrier in accordance with claim 1 is located in or on said structural element, said thermally expandable material being expanded to occupy the clearance between the carrier and the surface of the structural element facing the carrier.

8. A method for reducing the transfer of vibrations from a vibration generator comprised within an automobile vehicle to at least one constitutive part of the passenger compartment of said automotive vehicle, to which the vibration generator is connected via a structural element having the form of a tubular rail with a polygonal cross-section, said method comprising, successively:

selecting a dissipative vibratory wave barrier according to claim 1 having dimensions such that said dissipative vibratory wave barrier can be inserted into the structural element or fixed onto the structural element;

inserting the dissipative vibratory wave barrier into the structural element or fixing the dissipative vibratory wave barrier onto the structural element in a location close to the vibration generator; and expanding the thermally expandable material.

9. The method of claim 8, wherein the dimensions of the dissipative vibratory wave barrier are selected such that a clearance of about 1 to 10 mm between the surface of the dissipative vibratory wave barrier and the surface of the structural element facing said surface of the dissipative vibratory wave barrier having the coating present thereon is obtained.

10. The method of claim 8, wherein the thermally expandable material is expanded at a temperature of 130° C. to 240° C.

11. The method of claim 8, wherein the structural element is contacted with a liquid composition after the insertion or fixing of the dissipative vibratory wave barrier and thereafter heated in an oven, thus causing the expansion of the thermally expandable material.

12. The method of claim 8, wherein the coating comprises an amount of thermally expandable material that is selected such that, after expansion, the volume of thermally expandable material occupies the clearance between the carrier and the surface of the structural element facing the carrier.

* * * * *